3,187,738
PORTABLE PIPE MACHINING TOOL
Robert D. Christopher, 3125 N. 20th Ave.,
Phoenix, Ariz.
Filed Nov. 23, 1962, Ser. No. 239,537
9 Claims. (Cl. 125—13)

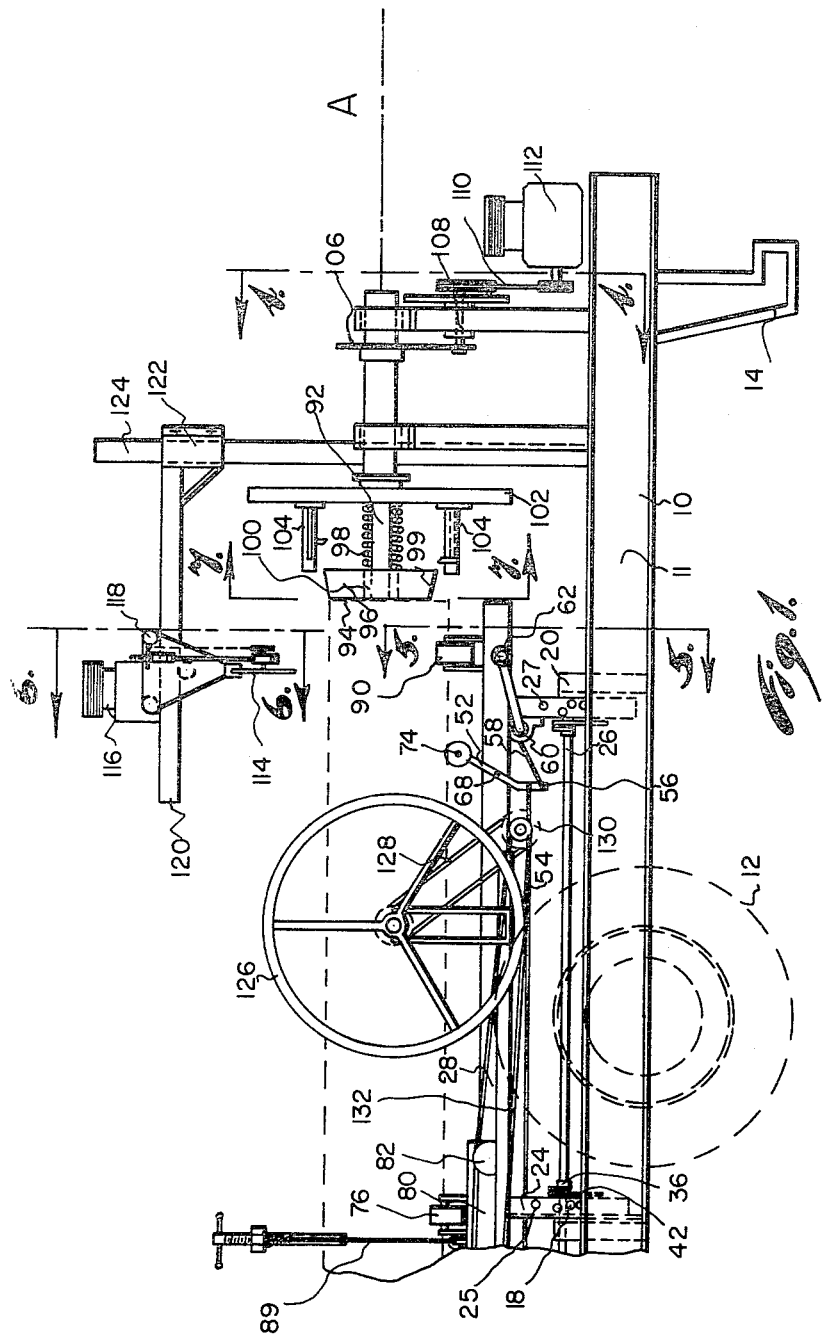

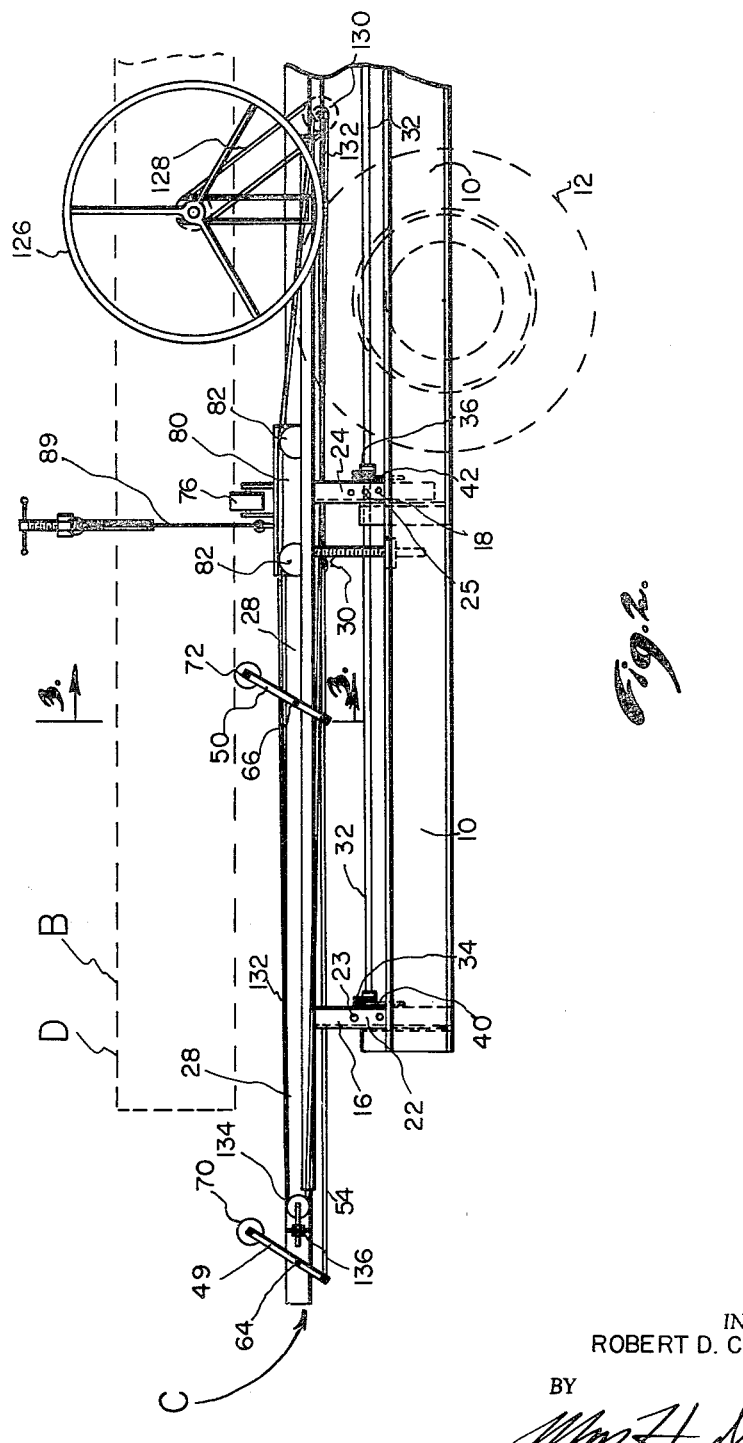

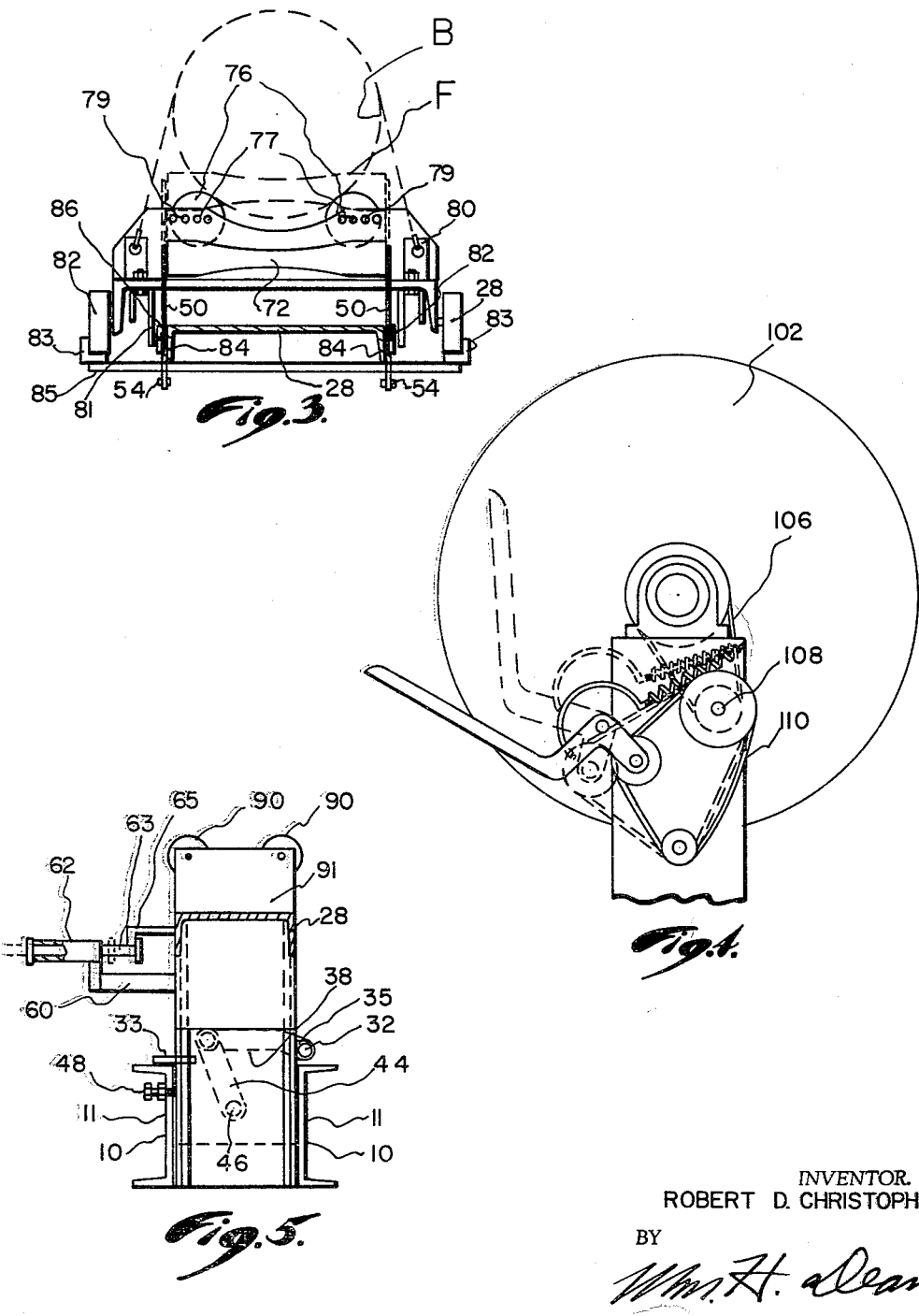

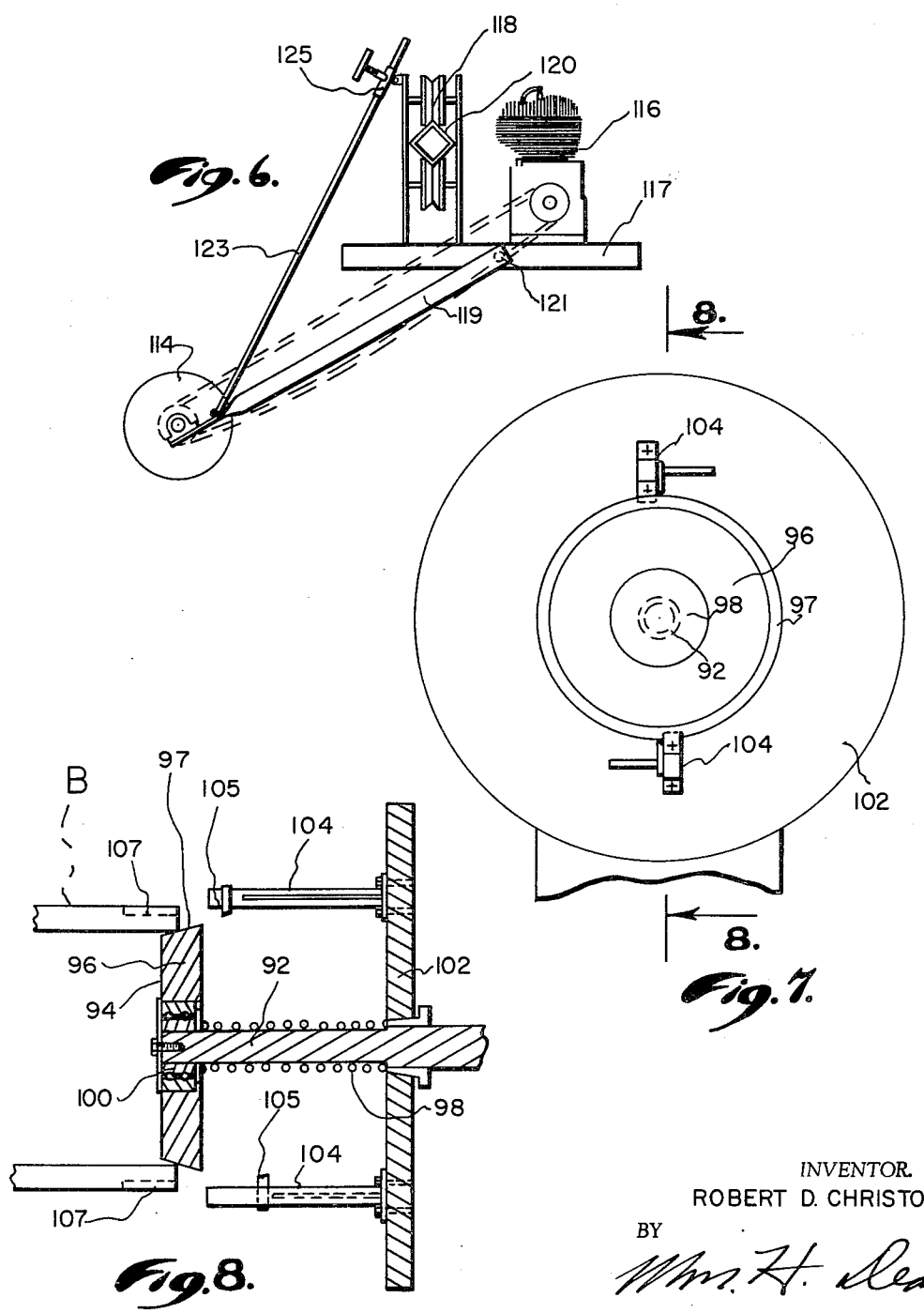

This invention relates to a portable pipe machining tool and more particularly to a portable pipe machining tool for use in handling, cutting, and machining cement pipe, as for example, such pipe as may be produced of asbestos and cement, or other similar pipe.

The handling, cutting, and/or machining of conventional cement pipe, such as "Transite" pipe, has been a problem, particularly to workmen in the field.

Heretofore, such pipe handling, cutting and machining operations have been carried on by heavy equipment in machine shops and it has been difficult to perform such operations remotely from areas wherein such pipe is installed.

It has been recognized that it would be highly desirable to handle machine and cut such pipe at locations in which such pipe is installed. However, this pipe is very heavy. It comes in large sections and ordinarily cannot be loaded into a lathe or similar machine of conventional character by a workman. In many instances, such cement pipe becomes cracked or broken and it is necessary to cut off the pipe and refinish the end by machining it to accept couplings. Thus, such broken pipe may be reclaimed and used. Cement pipe, referred to herein, may, for example, be in sections 13 feet long and 6 to 12 inches in diameter. Consequently, such pipe sections are very heavy and difficult for a laborer or machinist to handle without hoists or other similar equipment. Oftentimes, it is necessary to cut short lengths of this pipe and to turn the ends thereof to accept couplings. This becomes necessary in many installations where the dimensions of the installation dictate that the pipe be cut into lengths shorter than the standard lengths. Accordingly, such section may have to be cut from long heavy pieces of pipe and machined at the ends to accept fittings or couplings.

Much time has been lost in measuring and transporting pipe to a machine shop and back again to a job site in order to fit the pipe to a particular installation.

Even though such large, heavy pipe may be transported to a machine shop wherein large lathes are operable, such heavy pipe has been unwieldly from the standpoint that it cannot be loaded with facility into a large lathe by a single manual operator. It has been found that such large pipe, even when being loaded into a conventional lathe, requires hoists or other equipment in order to set the pipe in the lathe in position to be cut off or machined, as desired.

Accordingly, it is an object of the present invention to provide a portable pipe machining tool which readily facilitates the handling, cutting or machining of conventional heavy cement pipe.

Another object of the present invention is to provide a portable pipe machining tool having very novel means for loading a heavy piece of pipe into the tool in position so that it may be concentrically rotated relative to a cut-off tool and to a machining tool so that the pipe may easily be placed in the machine and cut off so that it may also be machined to accept conventional cement pipe couplings.

Another object of the invention is to provide a portable pipe machine tool having novel means which readily permits a single operator to handle heavy pipe and to load it properly into the machine of the invention without great effort.

Another object of the invention is to provide a novel portable pipe machining tool which may readily be used adjacent to an area in which pipe is installed and which very efficiently and very quickly cuts off and machines the ends of such pipes to accept conventional pipe couplings.

Another object of the invention is to provide a portable pipe machining tool having novel means permitting a large piece of pipe to be loaded into the end of the machine progressively by a single operator who may first raise one end of the pipe onto loading rollers whereupon the opposite end of the pipe may subsequently be lifted so that the pipe may be rolled longitudinally of the machine tool bed on said rollers and may subsequently be elevated by said rollers onto rollers at right angles to the axis of the loading rollers so that the pipe may be rotated in the machine for peripheral machining thereof.

Another object of the invention is to provide a portable pipe machining tool having novel pipe supporting means and co-operative head stock and cutter tool mechanism which is very simple and easy to operate and very efficient.

Another object of the invention is to provide a novel pipe machining tool having a novel arrangement of loading rollers and pipe turning rollers all of which co-operate to simplify manual handling, cut off and machining of concrete pipe.

Another object of the invention is to provide a portable pipe machining tool having novel pipe supporting rollers which permit the turning of the pipe in concentricity with a cone-type chuck engageable with the interior of one end of a piece of pipe which is spring-loaded to permit it to move axially relative to axially stationary cutters carried by a rotating head plate thereby simplifying the overall structure required concentrically to turn the ends of concrete pipe to accept conventional concrete pipe couplings.

Another object of the invention is to provide a portable pipe machining tool having novel means for accurately cutting off pipe having broken end portions.

Another object of the invention is to provide a pipe machining tool having a novel spring-loaded pipe end supporting chuck mechanism which permits pipe to be moved axially into a position wherein revolving cutters machine an external annular step in the pipe to receive a conventional cement pipe coupling.

Another object of the invention is to provide a portable pipe machining tool having novel means for elevating a pipe supporting carriage and for elevating pipe relative to the frame and to the carriage, the last mentioned elevating means being arranged in a novel manner to load the pipe onto the machine.

Other objects and advantages of the invention may be apparent from the following specification, appended claims, and accompanying drawings, in which:

FIG. 1 is a fragmentary side elevational view of the portable pipe machining tool of the present invention showing the head stock end thereof;

FIG. 2 is a fragmentary side elevational view of the tail stock end of the machine, as shown in FIG. 1 of the drawings;

FIG. 3 is an enlarged cross-sectional view taken from the line 3—3 of FIG. 1;

FIG. 4 is a fragmentary enlarged sectional view taken from the line 4—4 of FIG. 1;

FIG. 5 is an enlarged fragmentary sectional view taken from the line 5—5 of FIG. 1;

FIG. 6 is an enlarged fragmentary sectional view taken from the line 6—6 of FIG. 1;

FIG. 7 is an enlarged elevational view taken from the line 6—6 of FIG. 1, showing the head stock structure of the machine; and FIG. 8 is a fragmentary sectional view taken from the line 8—8 of FIG. 7.

As shown in FIG. 1, the machine is provided with a channel iron frame 10 supported by wheels 12 and retractable legs 14. The frame 10, as shown in FIG. 5 of the drawings, includes a pair of parallel channel members 11 which are spaced apart to support various components of the machine, as will be hereinafter described in detail. Disposed between the channel members 11 of the frame 10 are vertical slide tracks 16, 18 and 20, as shown best in FIGS. 1 and 2 of the drawings. Vertical slide bars 22, 24, and 26 are vertically slidable adjacent the slide tracks 16, 18, and 20, respectively, all as shown best in FIGS. 1 and 2 of the drawings.

A carriage frame 28 is carried by the slide bars 22, 24, and 26. A cross member 29 carried between the channels 11 is provided with an internally screwthreaded nut in which a screw 30 is rotatably mounted. This screw 30 is rotatably shouldered at its upper end relative to the carriage frame 28 and is provided with a handle 31 for manual operation of the screw 30 to elevate the carriage frame 28 relative to the frame 10 and thereby cause the slide bars 22, 24, and 26 to move vertically with respect to the slide tracks 16, 18, and 20, respectively. The slide bars 22, 24, and 26 are provided with openings 23, 25, and 27, respectively, in which pins may be placed and brought to bear upon the upper flange of one of the channels 11 to support the carriage frame 28, after it has been vertically elevated, manually, by the screw 30, The openings 23, 25, and 27 may receive pins 33, as shown in FIG. 5 of the drawings, so that these pins 33 are in shear and support the carriage frame 28 in proper position for holding a piece of pipe relative to the chuck of the machine, as will be hereinafter described. It will be appreciated that the openings 23, 25, and 27 are vertically spaced to coincide with various diameters of pipe for properly supporting the same, all as will be hereinafter described.

While the screw 30 is located at substantially an intermediate point longitudinally of the carriage frame 28, the force of the screw is coordinated by the shaft 32 having bell cranks 34, 36, and 38 connected to respective links 40, 42, and 44 which are pivotally connected to the respective slide bars 22, 24, and 26, all as indicated and disclosed in FIGS. 1 and 5 of the drawings. It will be seen that the shaft 32 is mounted by means of bearings 35 on the sides of respective slide tracks 16, 18, and 20 which are stationarily mounted on the frame channels 11. Thus, action of the screw 30 is coordinated throughout the entire longitudinal area of the carriage frame 28 by means of the shaft 32 and the respective bell crank and link mechanisms, hereinbefore described.

As shown in FIG. 5 of the drawings, the link 44 is pivotally connected to the slide bar 26 by means of a pin 46. The links 40 and 42 are likewise connected to the slide bars 22 and 24. Thus, the carriage frame 28 is vertically adjustable relative to the base frame 10 in order to accommodate operations on pipe of various diameters which must be aligned with an axis A of the head stock, as will be hereinafter described in detail. It will be appreciated that after the carriage frame 28 has been elevated by the shaft 32 and its connecting mechanism, that the pins 33 are installed, as shown in FIG. 5 of the drawings, in the respective openings 23, 25 and 27, and the carriage frame 28 is then permitted to gravitate to a position in which the pins 33 rest on the top flange of the respective frame channel 11. Thus, the carriage may be properly set to coincide with a pipe of a given diameter.

Set screws 48, in the frame channels 11, may be tightened to fix the slide bars 22, 24, and 26 relative to the frame 10 after the vertical adjustments have been made, as hereinbefore described, to set the desired elevation of the carriage 28 reltative to the frame 10 and to the head stock axis A of the machine.

Pivotally mounted on a carriage 28 are levers 49, 50, and 52 and these levers are all pivotally interconnected by a rod 54, shown best in FIGS. 1 and 2 of the drawings. This rod 54 pivotally interconnects the lower ends of the levers while the levers, as hereinafter described, are pivoted intermediate their ends on the carriage frame 28.

Connected to the lever 52, at 56, is a cable 58 wound around a shaft 60 having a crank handle 62 thereon. The levers 49, 50, and 52 are pivotally mounted on respective pivot pins 64, 66, and 68, on the carriage frame 28.

The handle 62 coupled to the shaft 60 is used manually to rotate the cable 58 onto the shaft 60 and thereby pivot the levers 49, 50, and 52, and when these levers are pivoted upward into position, as shown in FIGS. 1 and 2 of the drawings, a slide rod 63 reciprocally mounted in the handle 62 may be moved into position under a projecting member 65 on the frame 28 to hold the shaft 60 in position while pipe is being loaded onto the rollers 70, 72, and 74, as will be hereinafter described.

As shown in FIG. 3 of the drawings, the roller 72, and likewise the rollers 70 and 74, are provided with concave annular portions at their intermediate sections between the levers 50 and rods 54, so that a pipe B may readily be rolled onto the roller 70, first, by raising one end of the pipe off the ground and placing it on the roller 70 whereupon the opposite end of the pipe may subsequently be picked up and the pipe may be rolled longitudinally of the frame 28 and into position over turning rollers 76 carried by pivot pins 77 on the carriage 80 which is supported by rollers 82 in tracks 83 secured to the carriage frame 28 by cross-members 85.

The axes of the pipe supporting rollers 76 are disposed at substantially right angles to the axes of the pipe loading rollers 70 and 72.

It will be seen that when the levers 50, 52, and 54 are pivoted upwardly, that the respective rollers 70, 72, and 74 move to a broken line position F which places a pipe B in a position above the rollers 76 so that the pipe may readily be moved longitudinally thereover so that subsequent lowering of the rollers 70, 72, and 74 by release of the slide bar 63 from the member 65, as shown in FIG. 5 of the drawings, will permit lowering of the pipe B onto the rollers 76 of the carriage and onto similar rollers 90 carried by a bracket 91 on the carriage 28 near the head stock of the machine, as will be hereinafter described. It will be seen that these rollers 90 are at a substantially lower elevation than the rollers 76 which permit the pipe B to be disposed in a declined broken line position D, as shown in FIGS. 1 and 2 of the drawings, so that a broken pipe, at its broken end, may engage an end 94 of the chuck 96, as will be hereinafter described. It will be appreciated that the end C of the machine is open and is always clear so that a pipe may readily be loaded onto the roller 70, as hereinbefore described, and subsequently manually picked up at its opposite end and forced in a rolling action over the rollers 72 and 74.

It will be seen that the pins 77 may be placed in any one of a plurality of substantially horizontal openings 79 in the carriage 80, in order to space the rollers 76 properly to support pipes of varying diameters.

As shown in FIG. 3 of the drawings, the carriage 80 is provided with downwardly extending brackets 81 on which hold down rollers 84 are rotatably mounted. These rollers 84 engage tracks 86 which are fixed to the carriage frame 28. Thus, the carriage 80 is prevented from tilting relative to the frame 10 during machining operations carried on in connection with the cement pipe.

A hold down chain 89 is connected to the carriage frame 80 and is extended over the pipe B thereby holding it against the turning rollers 76 during peripheral machining operations on the pipe B, as will be hereinafter described in detail.

As hereinbefore described, the turning rollers 90, on the carriage frame 28, are disposed at an elevation below the turning rollers 76 so that the pipe may be tilted at a downwardly inclined angle toward the head stock of the machine, as indicated by broken lines D. Thus, a broken edge of the pipe, at one end, may engage an area 94 on a flat face of the head stock chuck plate 96 during a cut-off operation which may be performed by an abrasive cut-off wheel 114. The chuck plate 96 is slidably mounted on the shaft 92 by a double row bearing and when the broken pipe, at its end in engagement with the area 94 of the chuck, engages this chuck eccentrically, the double row bearing 97, as shown in FIG. 8 of the drawings, binds and thus holds the chuck plate 96 substantially stationary on its supporting shaft 92. A compression spring surrounding the shaft 92 tends to project the chuck plate 96 away from a head stock plate 102, all as shown best in FIG. 8 of the drawings. The head stock plate 102 supported on the shaft 92 carries cutter bars 104 which are disposed to turn external portions of pipe B when centered on a conical portion 99 of the chuck plate 96, as indicated by broken lines E, in FIG. 1 of the drawings. The cutter bars 104 carry cutting tools 105 disposed to turn an annular step in the periphery at the end of a piece of cement pipe when the chuck plate 96 is forced by the end of the pipe toward the plate 102 thereby compressing the spring 98 and carrying the end of the pipe into a position inwardly of the cutters 105 to machine a recess 107, as indicated best in FIG. 8 of the drawings by broken lines. Movement of the carriage 80 toward the chuck plate 96 in order to force the pipe B between the cutter bars 104, is accomplished by a carriage moving wheel 126 which operates a chain drive 128 to a sprocket 130 engaged with an endless cable 132 which also passes over another sprocket 134 with a slack take-up screw 136 supporting the same. This cable 132 is connected to the carriage frame 80 so that operation of the wheel 126 will move the carriage frame 80 by means of the rollers 82 on the frame angles 83. Thus, the turning rollers 76 and pipe may be carried toward the turning rollers 90 and the chuck plate 96 to cause the foregoing machining operation to be carried on in connection with one end of the pipe for machining a collar receiving step 107 therein.

The head stock plate 102 on the shaft 92 is driven rotatably by a chain and sprocket drive 106, jackshaft 108, chain and sprocket drive 110, all coupled to a motor 112.

An abrasive cut-off wheel 114 is driven by a motor 116 mounted on a trolley frame 118 which is adjustable longitudinally of the bar 120, extending horizontally from a slide bearing 122 vertically adjustably mounted on a frame bar 124.

As shown best in FIG. 6 of the drawings, the trolley 120 carries a motor base 117 to which a wheel carrying frame 119 is pivotally mounted at 121. An adjustable brace 123 is adjustably fixed to the trolley 118 at 125 so that the abrasive wheel 114 may be adjusted relative to the pipe B in the machine to thereby accommodate varying diameters thereof. Additionally, it will be seen that the abrasive cut-off wheel 114 may be vertically adjusted by means of the slide bearing 122 movable vertically on the frame bar 24 and additionally, the cut-off wheel 114 is adjustable radially of the pipe by means of the bracket 119 pivoted at 121 on the carriage 117.

The abrasive cut-off wheel 114 is also adjustable longitudinally of the pipe on the bar 120 whereby various diameters of pipe may readily be accommodated by the abrasive cut-off wheel when held on the turning rollers 76 and engaged with the chuck plate 96. It will be appreciated that cracked pipe may be cut off at varying distances from the chuck plate 96 and that various diameter pipe may readily be handled and cut off, as hereinbefore described.

It will be here noted that the turning rollers 90 are mounted on axes which are at a slight acute angle relative to the axis of the pipe B so that they tend to create a helical traction on the pipe B causing it to move toward the chuck plate 96 and maintain an engagement of the broken end of the pipe at the surface 94 of the chuck plate while the pipe is rotated during operation of the abrasive cut-off wheel 114. Thus, the pipe, with a broken end, may be engaged at the surface 94 and the abrasive cut-off wheel may be operated to cut off the pipe when it is manually rotated.

As hereinbefore described, the bearing 97 binds when broken pipe engages the surface 94 eccentrically of the chuck plate 96 thus, preventing the chuck plate from being forced axially of the shaft 92 by the helical traction on the rollers 90, hereinbefore described.

In operation of the present pipe machining tool, an operator may load heavy pipe, as hereinbefore described, by first raising the end of the pipe B onto the roller 70 and then picking up the opposite end from the ground and raising it to an elevation substantially coinciding with the roller 70 so that the pipe may be progressively moved on the roller 70 to the roller 72 and the roller 74. The pipe may then be lowered onto the rollers 76 and 90, hereinbefore described, and since the roller 90 is substantially lower than the roller 76, a broken end of a pipe may engage the surface 94 of the chuck plate 96 eccentrically, as hereinbefore described. While the chuck plate 96 turns freely on the bearing 96, as the pipe is manually rotated, the chuck plate 96 does not move longitudinally of the shaft 92, as hereinbefore described, and thus, the pipe is maintained longitudinally in position to permit the abrasive cut-off wheel 114 to cut the pipe off in an annular neat cut.

When the broken pipe has been cut off, it may then subsequently be chucked up on the conical surface 97 of the chuck plate 96. This conical surface fits the inside of the pipe and centers it so that it may roll on the turning rollers 76 and run freely above the turning rollers 90. In this position, the pipe is held concentrically aligned with the cutters on the cutter bars 104.

It will be appreciated that the pipe B may be stationary while the head stock plate 102 is turned by the motor 112. The pipe clamped by the clamp chain 89 may be fed into the cutters on the cutter bars 104 by actuation of the wheel 126 and the pipe is thus forced longitudinally of the axis of the head stock assembly by movement of the carriage 80 thereby causing the pipe to force the chuck plate 96 against compression of the spring 98 so that the chuck plate 96 passes inwardly of the cutter bars 104. As this action occurs, the external surface of the pipe passes inwardly of the cutters 105 whereupon the external surface of the pipe is machined to provide an annular recess portion 107. This machining is very smooth and provides a position for a pipe connecting collar.

The end of the pipe and the chuck plate 96, as it moves toward the head stock plate 102 permits the recess to be any desired length longitudinally of the pipe. This length may be determined or limited by the overall length of the cutter bars 104 and the disposition of the cutters 105 from the plate 102 and the relative position of the chuck plate 96 carried by the shaft 92. These dimensions may be varied, as desired, in the construction of the machine.

It is intended that the terms, chuck or chuck means, as used herein shall be construed as a means for engaging one end of a piece of pipe during cutoff operations thereon or for centering one end of the pipe while turning or machining an annular collar engaging step portion on the pipe.

It will be obvious to those skilled in the art that various modifications of the present invention may be resorted to in a manner limited only by a just interpretation of the following claims.

I claim:

1. In a pipe machining tool the combination of: a main frame; a pipe chuck means rotatably mounted thereon; a carriage frame vertically movably mounted on said main frame; a plurality of pipe loading rollers disposed in spaced relation to each other on said carriage frame and having horizontal axes disposed at right angles to that of said pipe chuck means; a carriage movable longitudinally on said carriage frame toward and away from said pipe chuck means; first pipe supporting rollers on said carriage and having axes disposed substantially at right angles to those of said pipe loading rollers; means mounting said pipe loading rollers for vertical movement on said carriage frame whereby pipe disposed on said pipe loading rollers may be supported above said pipe supporting rollers and lowered into position thereon; one of said pipe loading rollers being disposed at an end of said carriage frame opposite from an end thereof which is nearest said pipe chuck means whereby pipe may be loaded onto one end of said carriage frame by placing one end of a piece of pipe on said one pipe loading roller and then progressively moving said pipe longitudinally of its axis and progressively onto the remaining ones of said pipe loading rollers; second pipe supporting rollers on said carriage frame and disposed near said pipe chuck means, said second pipe supporting rollers disposed slightly below said first pipe supporting rollers; and a pipe machining means movable adjacent to said chuck means for performing peripheral machining of pipe engaged with said chuck means.

2. In a pipe machining tool the combination of: a main frame; a pipe chuck means rotatably mounted thereon; a carriage frame vertically movably mounted on said main frame; a plurality of pipe loading rollers disposed in spaced relation to each other on said carriage frame and having horizontal axes disposed at right angles to that of said pipe chuck means, a carriage movable longitudinally on said carriage frame toward and away from said pipe chuck means; first pipe supporting rollers on said carriage and having axes disposed substantially at right angles to those of said pipe loading rollers; means mounting said pipe loading rollers for vertical movement on said carriage frame whereby pipe disposed on said pipe loading rollers may be supported above said pipe supporting rollers and lowered into position thereon; one of said pipe loading rollers being disposed at one end of said carriage frame opposite from an end thereof which is nearest said pipe chuck means whereby pipe may be loaded onto one end of said carriage frame by placing one end of a piece of pipe on said one pipe loading roller and then progressively moving said pipe longitudinally of its axis and progressively onto the remaining ones of said pipe loading rollers; second pipe supporting rollers on said carriage frame and disposed near said pipe chuck means, said second pipe supporting rollers disposed slightly below said first pipe supporting rollers; a face portion of said pipe chuck means disposed to be engaged by one end of a piece of pipe when supported on said second pipe supporting rollers and a cutoff means movable laterally of the axis of said chuck means and disposed to cutoff pipe when an end thereof is disposed against said face portion.

3. In a pipe machining tool the combination of: a main frame; a pipe chuck means rotatably mounted thereon; a carriage frame vertically movably mounted on said main frame; a plurality of pipe loading rollers disposed in spaced relation to each other on said carriage frame and having horizontal axes disposed at right angles to that of said pipe chuck means; a carriage movable longitudinally on said carriage frame toward and away from said pipe chuck means; first pipe supporting rollers on said carriage and having axes disposed substantially at right angles to those of said pipe loading rollers; means mounting said pipe loading rollers for vertical movement on said carriage frame whereby pipe disposed on said pipe loading rollers may be supported above said pipe supporting rollers and lowered into position thereon; one of said pipe loading rollers being disposed at one end of said carriage frame opposite from an end thereof which is nearest said pipe chuck means whereby pipe may be loaded onto one end of said carriage frame by placing one end of a piece of pipe on said one pipe loading roller and then progressively moving said pipe longitudinally of its axis and progressively onto the remaining ones of said pipe loading rollers; second pipe supporting rollers on said carriage frame and disposed near said pipe chuck means, said second pipe supporting rollers disposed slightly below said first pipe supporting rollers; a face portion of said pipe chuck means disposed to be engaged by one end of a piece of pipe when supported on said second pipe supporting rollers; said second rollers having axes disposed at an acute angle to the axis of said chuck means to provide a helical friction drive of pipe toward said face portion of said pipe chuck means; and a cutoff means movable laterally of the axis of said chuck means and disposed to cutoff pipe when an end thereof is disposed adjacent said face portion.

4. In a pipe machining tool the combination of: a main frame; a pipe chuck means rotatably mounted thereon; a carriage frame vertically movably mounted on said main frame; a plurality of pipe loading rollers disposed in spaced relation to each other on said carriage frame and having horizontal axes disposed at right angles to that of said pipe chuck means; a carriage movable longitudinally on said carriage frame toward and away from said pipe chuck means; first pipe supporting rollers on said carriage and having axes disposed substantially at right angles to those of said pipe loading rollers; means mounting said pipe loading rollers for vertical movement on said carriage frame whereby pipe disposed on said pipe loading rollers may be supported above said pipe supporting rollers and lowered into position thereon; one of said pipe loading rollers being disposed at an end of said carriage frame opposite from an end thereof which is nearest said pipe chuck means whereby pipe may be loaded onto one end of said carriage frame by placing one end of a piece of pipe on said one pipe loading roller and then progressively onto the remaining ones of said pipe loading rollers; said pipe chuck means having a conical surface disposed to fit in an open end of a piece of pipe supported on said first pipe supporting rollers; cutter means rotatable around said pipe chuck means and disposed to machine an annular collar receiving step on said pipe.

5. In a pipe machining tool the combination of: a main frame; a pipe chuck rotatably mounted thereon; a carriage frame vertically movably mounted on said main frame; a plurality of pipe loading rollers disposed in spaced relation to each other on said carriage frame and having horizontal axes disposed at right angles to that of said pipe chuck; a carriage movable longitudinally on said carriage frame toward and away from said pipe chuck; first pipe supporting rollers on said carriage and having axes disposed substantially at right angles to those of said pipe loading rollers; means mounting said pipe loading rollers for vertical movement on said carriage frame whereby pipe disposed on said pipe loading rollers may be supported above said pipe supporting rollers and lowered into position thereon; one of said pipe loading rollers being disposed at an end of said carriage frame opposite from an end thereof which is nearest said pipe chuck whereby pipe may be loaded onto one end of said carriage frame by placing one end of a piece of pipe on said one pipe loading roller and then progressively onto the remaining ones of said pipe loading rollers; said pipe chuck having a conical surface disposed to fit in an open end of a piece of pipe supported on said first pipe supporting rollers; cutter means rotatable around said pipe chuck and disposed to machine an annular collar receiving step on said pipe; a drive shaft for said cutter means, said pipe chuck slidable longitudinally thereof and rotatable thereon; a compression spring tending to resist slidable movement of said pipe chuck on said shaft toward said cutter means.

6. In a pipe machining tool the combination of: a main frame; a pipe chuck rotatably mounted thereon; a carriage frame vertically movably mounted on said main frame; a plurality of pipe loading rollers disposed in spaced relation to each other on said carriage frame and having horizontal axes disposed at right angles to that of said pipe chuck; a carriage movable longitudinally on said carriage frame toward and away from said pipe chuck; first pipe supporting rollers on said carriage and having axes disposed substantially at right angles to those of said pipe loading rollers; means mounting said pipe loading rollers for vertical movement on said carriage frame whereby pipe disposed on said pipe loading rollers may be supported above said pipe supporting rollers and lowered into position thereon; one of said pipe loading rollers being disposed at an end of said carriage frame opposite from an end thereof which is nearest said pipe chuck whereby pipe may be loaded onto one end of said carriage frame by placing one end of a piece of pipe on said one pipe loading roller and then progressively onto the remaining ones of said pipe loading rollers; said pipe chuck having a conical surface disposed to fit in an open end of a piece of pipe supported on said first pipe supporting rollers; cutter means rotatable around said pipe chuck and disposed to machine an annular collar receiving step on said pipe; a drive shaft for said cutter means, said pipe chuck slidable longitudinally thereof and rotatable thereon; a compression spring tending to resist slidable movement of said pipe chuck on said shaft toward said cutter means; pipe holding means on said carriage; and means for advancing said carriage on said carriage frame toward said cutter means while one end of said pipe is held on said conical surface of said pipe chuck, whereby force of said carriage moves said pipe and said pipe chuck causing compression of said spring and thereby moving an end of said pipe into interference with said cutter means.

7. In a pipe machining tool the combination of: a main frame; a pipe chuck means rotatably mounted thereon; a carriage frame vertically movably mounted on said main frame; a plurality of pipe loading rollers disposed in spaced relation to each other on said carriage frame and having horizontal axes disposed at right angles to that of said pipe chuck means; a carriage movable longitudinally on said carriage frame toward and away from said pipe chuck means; first pipe supporting rollers on said carriage and having axes disposed substantially at right angles to those of said pipe loading rollers; means mounting said pipe loading rollers for vertical movement on said carriage frame whereby pipe disposed on said pipe loading rollers may be supported above said pipe supporting rollers and lowered into position thereon; one of said pipe loading rollers being disposed at one end of said carriage frame opposite from an end thereof which is nearest said pipe chuck means whereby pipe may be loaded onto one end of said carriage frame by placing one end of a piece of pipe on said one pipe loading roller and then progressively moving said pipe longitudinally of its axis and progressively onto the remaining ones of said pipe loading rollers; second pipe supporting rollers on said carriage frame and disposed near said pipe chuck means, said second pipe supporting rollers disposed slightly below said first pipe supporting rollers; a face portion of said pipe chuck means disposed to be engaged by one end of a piece of pipe when supported on said second pipe supporting rollers; said second rollers having axes disposed at an acute angle to the axis of said chuck means to provide a helical friction drive of pipe toward said face portion of said pipe chuck means; a power driven abrasive cut-off wheel disposed near said pipe chuck means and mounted on said frame to move laterally of the axis of said pipe chuck means; means supporting said abrasive cut-off wheel to move vertically and also longitudinally of the axis of said pipe chuck means.

8. In a pipe machining tool the combination of: a main frame; a pipe chuck means rotatably mounted thereon; a carriage frame vertically movably mounted on said main frame; a plurality of pipe loading rollers disposed in spaced relation to each other on said carriage frame and having horizontal axes disposed at right angles to that of said pipe chuck means; a carriage movable longitudinally on said carriage frame toward and away from said pipe chuck means; first pipe supporting rollers on said carriage and having axes disposed substantially at right angles to those of said pipe loading rollers; means mounting said pipe loading rollers for vertical movement on said carriage frame whereby pipe disposed on said pipe loading rollers may be supported above said pipe supporting rollers and lowered into position thereon; one of said pipe loading rollers being disposed at an end of said carriage frame opposite from an end thereof which is nearest said pipe chuck means whereby pipe may be loaded onto one end of said carriage frame by placing one end of a piece of pipe on said one pipe loading roller and then progressively moving said pipe longitudinally of its axis and progressively onto the remaining ones of said pipe loading rollers; cutter means rotatable around the axis of said pipe chuck means and disposed to machine an annular collar receiving step on said pipe; a drive shaft for said cutter means, said pipe chuck slidable longitudinally of said drive shaft and rotatable thereon; pipe holding means on said carriage and means for advancing said carriage on said carriage frame toward said cutter means while one end of said pipe is held by said pipe chuck means, thereby moving an end of said pipe into interference with said cutter means.

9. In a pipe machining tool the combination of: a main frame; a pipe chuck means rotatably mounted thereon; a carriage frame vertically movably mounted on said main frame; a plurality of pipe loading rollers disposed in spaced relation to each other on said carriage frame and having horizontal axes disposed at right angles to that of said pipe chuck means; a carriage movable longitudinally on said carriage frame toward and away from said pipe chuck means; first pipe supporting rollers on said carriage and having axes disposed substantially at right angles to those of said pipe loading rollers; means mounting said pipe loading rollers for vertical movement on said carriage frame whereby pipe disposed on said pipe loading rollers may be supported above said pipe supporting rollers and lowered into position thereon; one of said pipe loading rollers being disposed at an end of said carriage frame opposite from an end thereof which is nearest said pipe chuck means whereby pipe may be loaded onto one end of said carriage frame by placing one end of a piece of pipe on said one pipe loading roller and then progressively moving said pipe longitudinally of its axis and progressively onto the remaining ones of said pipe loading rollers; and axially into alignment and engagement with said chuck means; said chuck being axially stationary with respect to said main frame; said carriage frame being vertically movable with respect to said main frame, whereby said carriage may be movable longitudinally thereon and operable to carry pipe of varying diameters into axial alignment with said chuck by reason of the vertically movable mounting of said carriage frame on said main frame.

References Cited by the Examiner
UNITED STATES PATENTS

| | | | |
|---|---|---|---|
| 826,679 | 7/06 | Marks | 144—205 |
| 1,928,811 | 10/33 | Burns. | |
| 2,166,608 | 7/39 | Postlewaite. | |
| 2,359,167 | 9/44 | Somes. | |
| 2,600,481 | 6/52 | Clyde | 51—105 |
| 2,989,094 | 6/61 | Panavas. | |
| 3,046,707 | 7/62 | Obear | 51—178 |

FOREIGN PATENTS

| | | |
|---|---|---|
| 621,564 | 11/35 | Germany. |
| 845,035 | 8/60 | Great Britain. |

LESTER M. SWINGLE, *Primary Examiner.*

JOHN C. CHRISTIE, *Examiner.*